US012733650B2

(12) United States Patent
Chappell

(10) Patent No.: US 12,733,650 B2
(45) Date of Patent: Sep. 15, 2026

(54) ROLLER ASSEMBLY FOR LOIN PULLER MACHINE

(71) Applicant: Hall Fabrication, Inc., Henderson, NV (US)

(72) Inventor: David Chappell, Las Vegas, NV (US)

(73) Assignee: Hall Fabrication, Inc., Henderson, NV (US)

( * ) Notice: Subject to any disclaimer, the term of this patent is extended or adjusted under 35 U.S.C. 154(b) by 13 days.

(21) Appl. No.: 18/827,115

(22) Filed: Sep. 6, 2024

(65) Prior Publication Data

US 2026/0068895 A1 Mar. 12, 2026

(51) Int. Cl.
*A22C 17/00* (2006.01)

(52) U.S. Cl.
CPC ...... *A22C 17/0033* (2013.01); *A22C 17/0093* (2013.01)

(58) Field of Classification Search
CPC .............. A22B 5/0094; A22C 17/0093; A22C 17/0033; A22C 17/02; B65B 17/06; B65B 2201/0202
USPC .......................................................... 452/171
See application file for complete search history.

(56) References Cited

U.S. PATENT DOCUMENTS

| | | | | | |
|---|---|---|---|---|---|
| 5,234,371 | A | | 8/1993 | Andre et al. | |
| 5,295,898 | A | | 3/1994 | Andre et al. | |
| 5,407,384 | A | * | 4/1995 | Boody | A22B 5/0005 452/134 |
| 5,882,252 | A | * | 3/1999 | Boody | A22B 5/0041 452/136 |
| 6,155,919 | A | * | 12/2000 | Haagensen | A22C 17/0046 452/158 |
| 7,214,129 | B2 | * | 5/2007 | Couture | A22C 17/0046 452/171 |
| 2002/0031996 | A1 | * | 3/2002 | Dufour | A22B 5/0005 452/171 |
| 2006/0035576 | A1 | * | 2/2006 | Bruce | A22B 5/0035 452/171 |
| 2006/0052043 | A1 | * | 3/2006 | Couture | A22C 17/0046 452/171 |
| 2007/0184767 | A1 | * | 8/2007 | Roy | A22C 17/0046 452/171 |

* cited by examiner

*Primary Examiner* — Richard T Price, Jr.
(74) *Attorney, Agent, or Firm* — McKee, Voorhees & Sease, PLC

(57) ABSTRACT

A loin puller machine includes a frame, a conveyor, and a series of blades, including a Z blade, a J blade, and a trim blade. A roller assembly is mounted to the frame and includes an arm with a roller on the lower end. The roller arm is spring biased. The roller engages the carcass and applies a downward force on the carcass directly over the J blade cutting edge so as to provide more accurate and consistent cutting of fatback from the loin portion for increased yield and profitability.

17 Claims, 15 Drawing Sheets

ROLLER ASSEMBLY FOR LOIN PULLER MACHINE

TECHNICAL FIELD

The invention relates to a loin pulling machine, and particularly, to a roller assembly for applying a down force to the loin carcass as the carcass is cut by the J blade.

BACKGROUND

The A loin pulling machine conveys pork carcasses past a series of blades to remove the loin portion from the belly and fatback portions. The blades include a J blade, a Z blade, a trim blade, and a hoop blade. The blades each have opposite ends for mounting to the loin pulling machine, and a sharpened edge for cutting the meat. Examples of blades with a sweep edge which gradually enters the carcass are described in Applicant's co-pending application Ser. No. 18/416,535 entitled SWEEP EDGE BLADES FOR LOIN PULLER MACHINE, which is incorporated herein by reference in its entirety.

In a conventional loin puller machine, there is inherent instability in the cut while separating the fatback from the loin with the J blade, due to the lack of downward pressure on the loin while the loin is being cut by the J blade. This instability leads to inconsistent cut depth. Lack of control over the depth of the cut by the J blade means yield loss, which equals lost profits.

One example of a conventional loin puller machine is shown and described in U.S. Pat. No. 5,882,252. In FIG. 1, the J blade is designated by the reference numeral 26. A roller is shown to the right of the J blade 26, which is downstream from the cutting edge of the J blade. Such a downstream roller does not provide satisfactory pressure to the loin carcass as the fatback is being cut by the J blade. The insufficient pressure allows the blade to cut irregularly into the loin, which inherently results in valuable meat being wasted. As an example, in a typical operation, each loin puller machine runs for 16 hours per day, cutting 1500 (or more) carcasses per hour. If the J blade cut is ⅛ inch off, ½ pound of meat per loin is lost, amounting to thousands of dollars per hour and millions of dollars per year of lost profits per machine.

Thus, there is a need in the industry for improved accuracy for cutting loin carcasses on a loin puller machine, so as to minimize waste, maximize yield, and increase profits.

Therefore, a primary objective of the present invention is a provision of a loin puller machine having a roller assembly aligned with the J blade to provide downward pressure on the loin carcass as the carcass is cut by the J blade, thereby improving accuracy of the cut, increasing yield, and maximizing profit.

Another objective of the present invention is the provision of a method of cutting fatback from a loin carcass on a loin puller machine which applies pressure to the carcass immediately adjacent the J blade so as to provide a consistent and accurate cut, thereby increasing yield and profitability.

A further objective of the present invention is the provision of a roller assembly for a loin puller machine which applies downward pressure on the carcass directly above the J blade so as to provide consistent fatback cuts.

Still another objective of the present invention is the provision of a roller assembly for a loin puller machine wherein the roller of the assembly is aligned with the J blade for improved cutting of the fatback portion from the loin portion of the carcass.

These and other objectives become apparent from the following description of the invention.

SUMMARY

A loin puller machine includes a conveyor for moving loin carcasses past a series of blades for cutting portions of meat from the carcass. The J blade cuts the fatback portion from the loin portion. A roller assembly is mounted on the frame of the loin puller machine and is aligned with the J blade. The roller assembly includes a spring biased roller which rides along a top portion of the carcass to apply downward pressure to the carcass directly above the J blade. This alignment of the roller assembly with the J blade provides consistent and accurate cutting of fatback portions from the loin portions by the J blade, thereby increasing yield and profits.

The top cap of the machine has been modified to allow the take-up arm of the roller assembly to be mounted to the frame for alignment of the roller with the J blade. The design of the cap also allows easier access to the mounting hardware for the take-up arms of the roller assembly for repair or replacement when needed.

DETAILED DESCRIPTION

Figure 1:
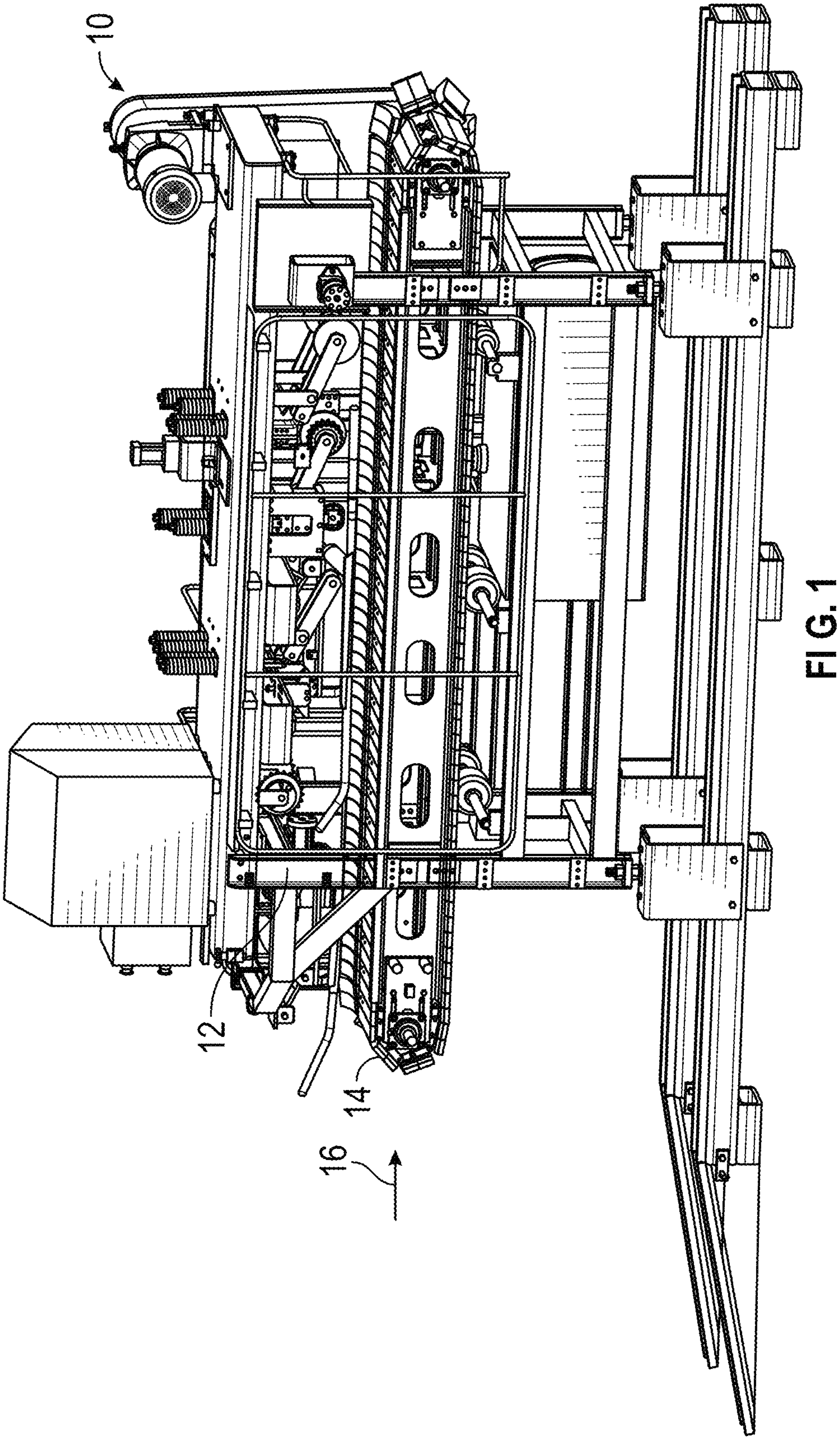
FIGS. 1 and 2 are perspective views of a loin puller machine, from opposite sides of the machine.
Figure 2:
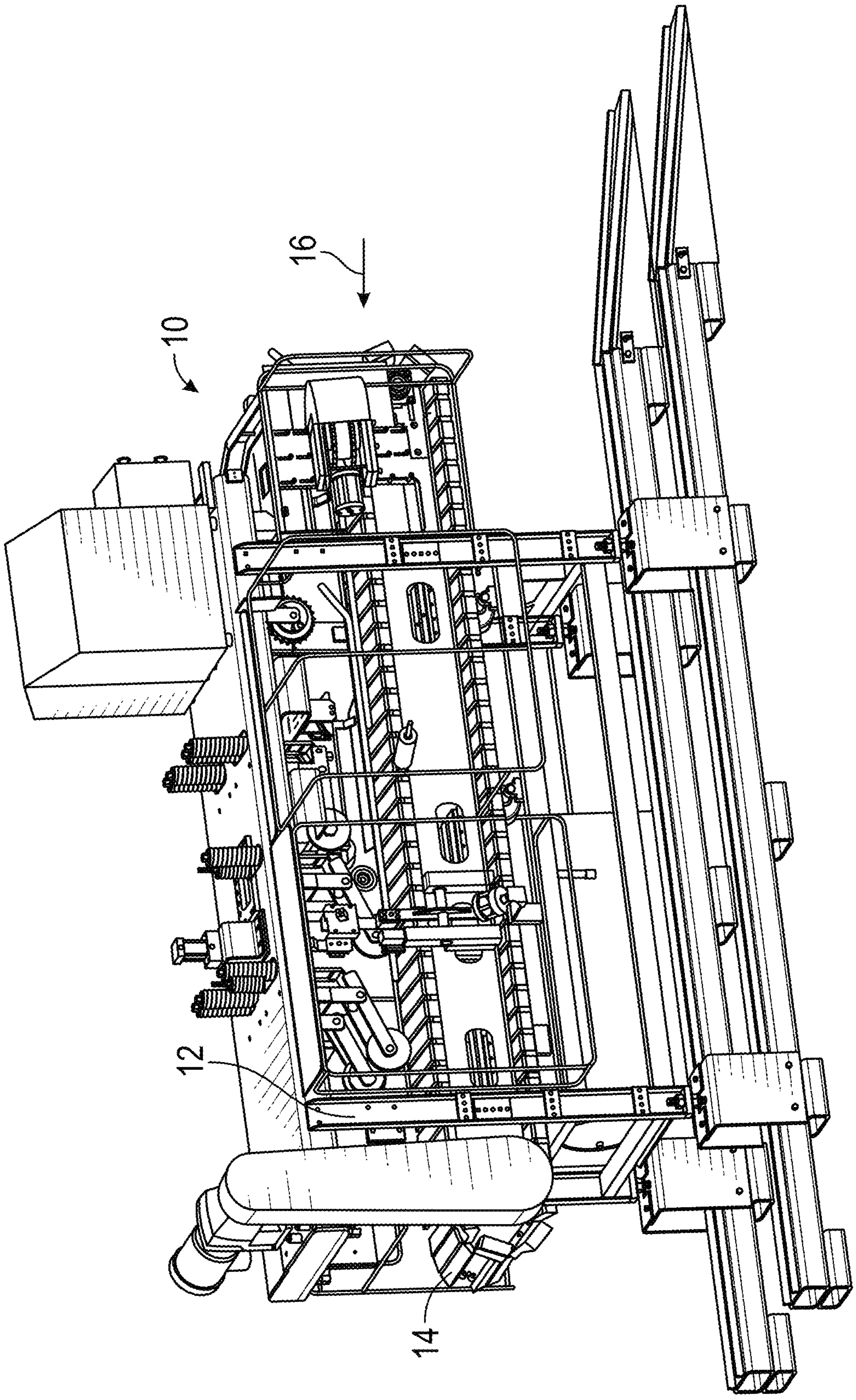
Figure 3:
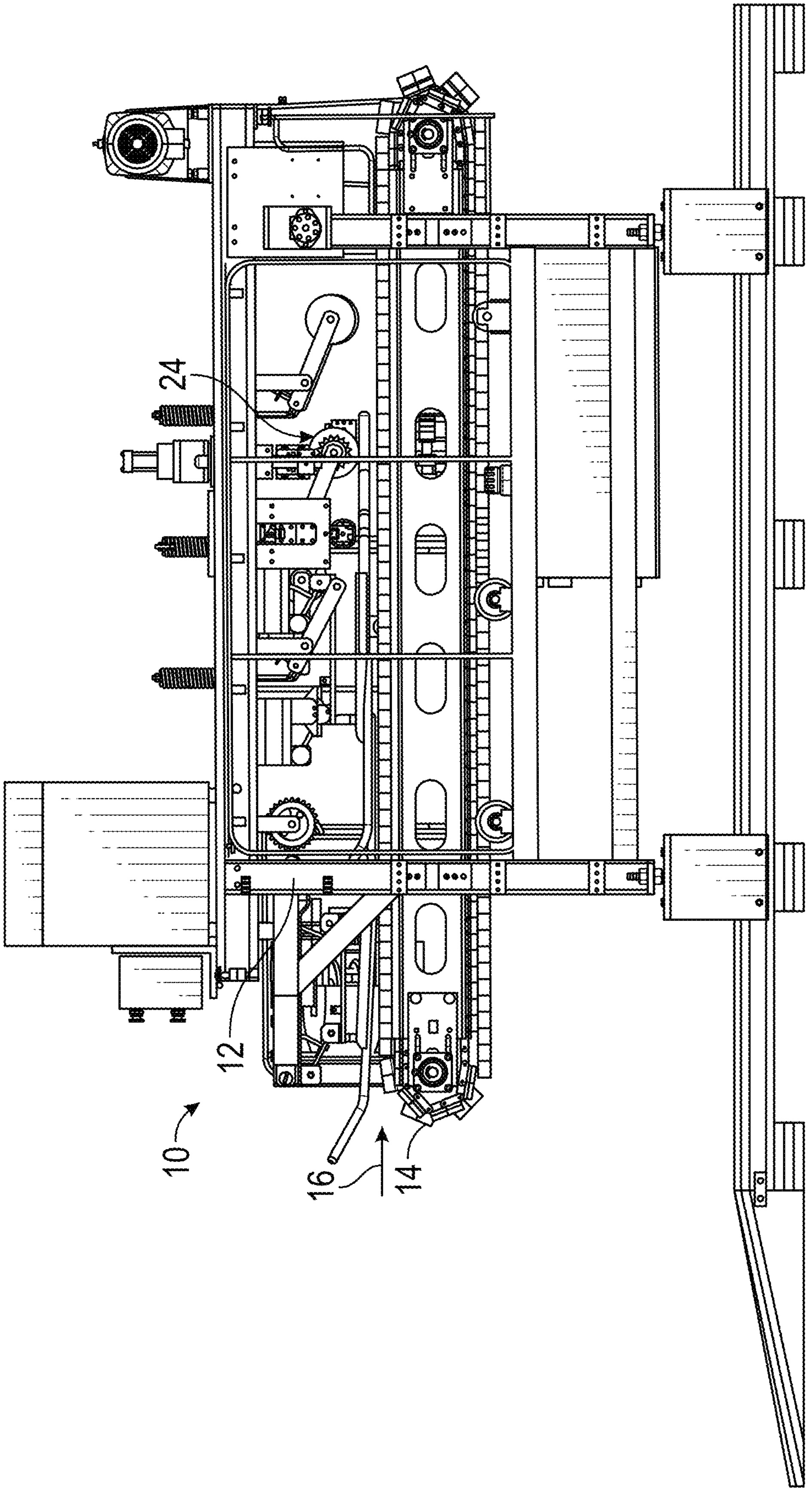
FIGS. 3 and 4 are side elevation views of the machine shown in FIG. 1, from opposite sides of the machine.
Figure 4:
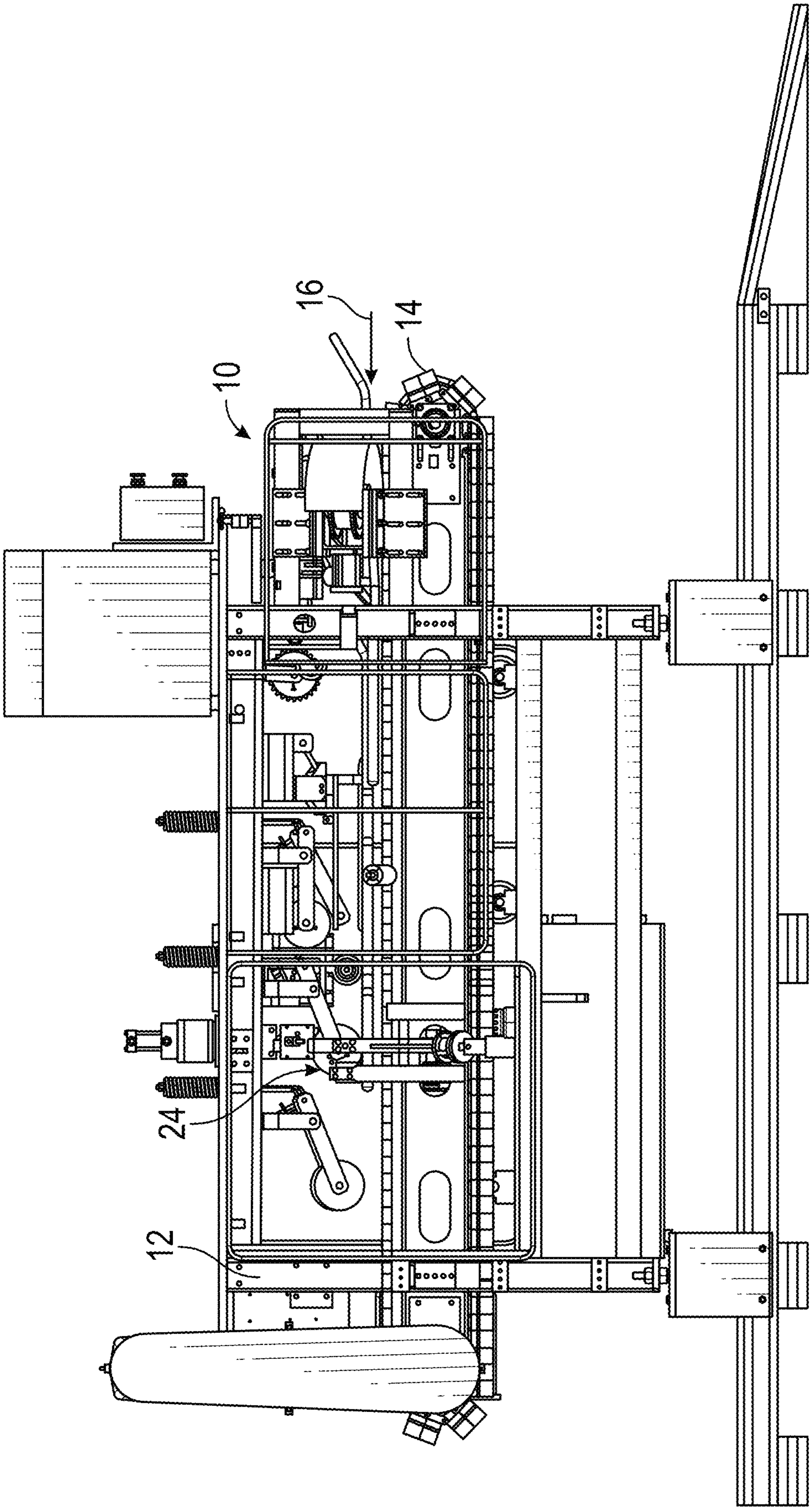
Figure 5:
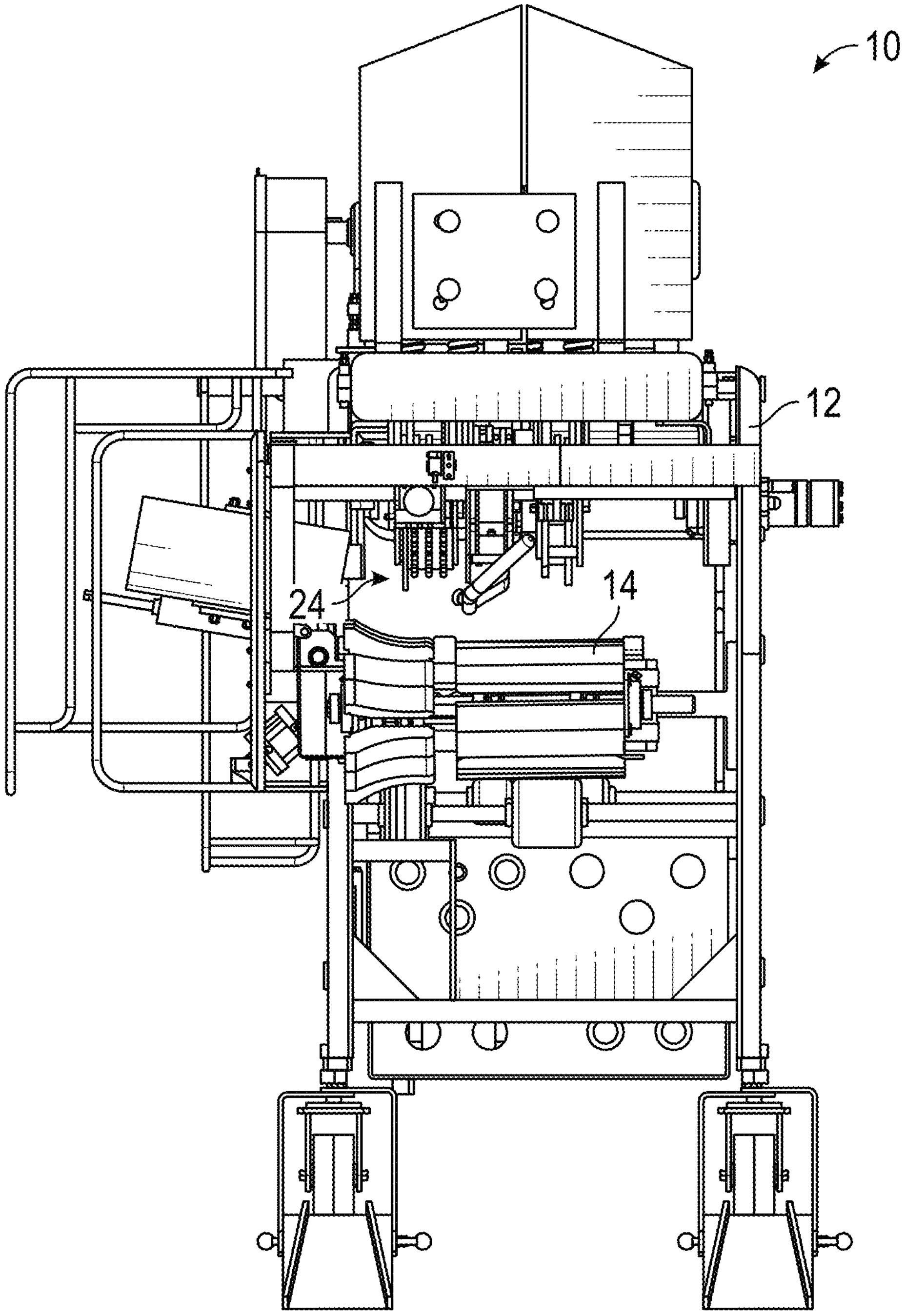
FIG. 5 is a front end elevation view of the loin puller machine shown in FIG. 1.
Figure 6:
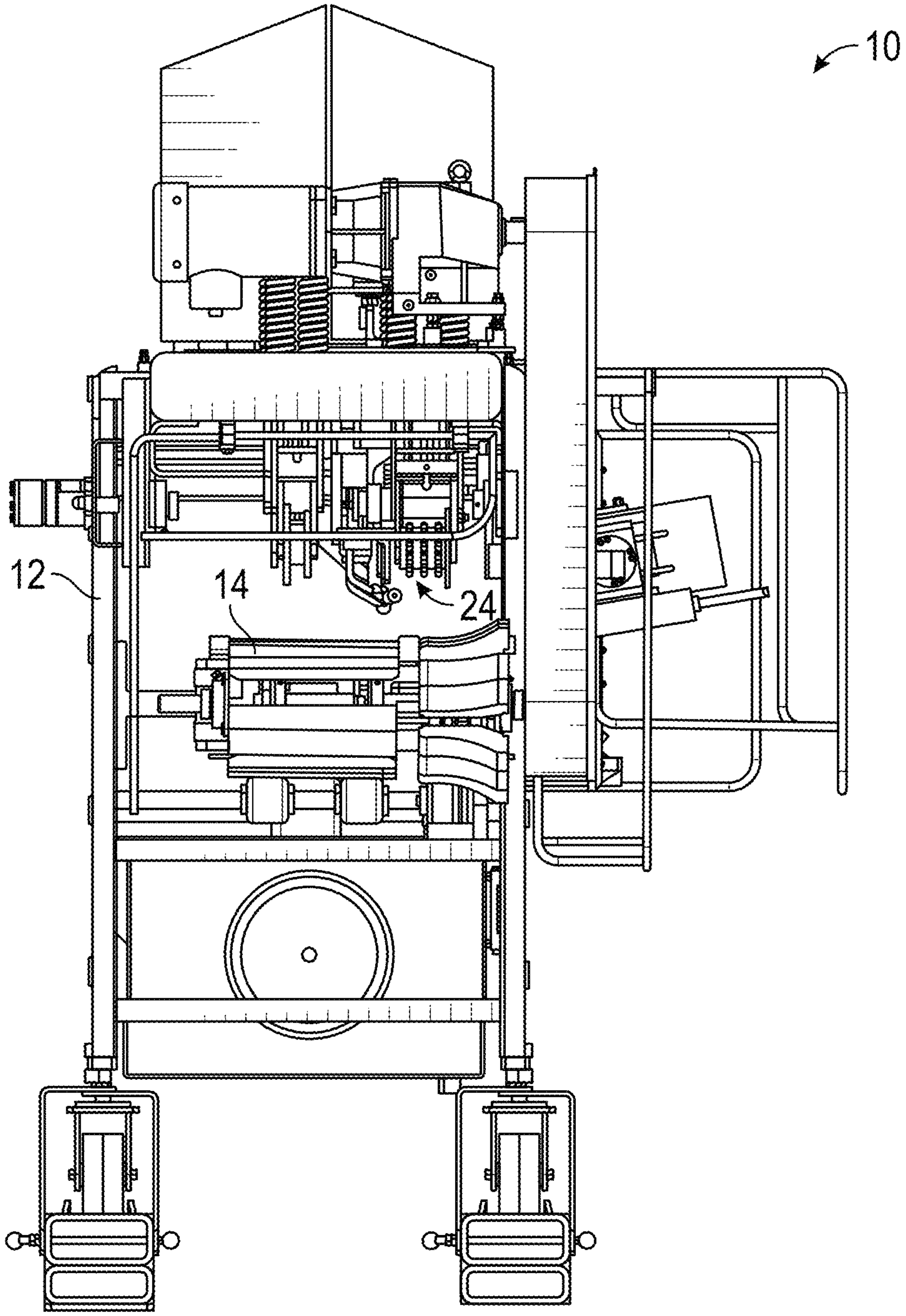
FIG. 6 is a rear end elevation view of the loin puller machine shown in FIG. 1.
Figure 7:
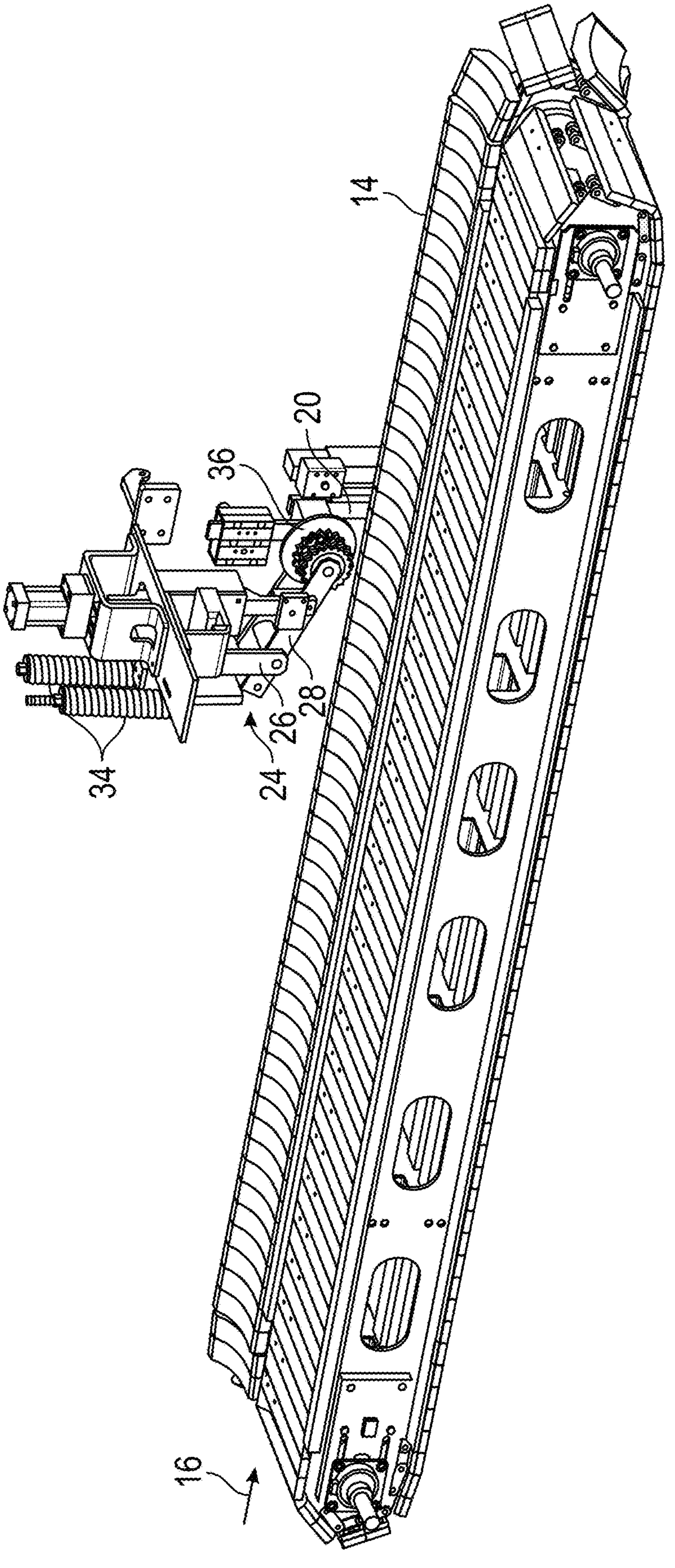
FIG. 7 is a perspective view of the conveyor, J blade, and roller assembly of the loin puller machine, with other structure of the machine removed for clarity.
Figure 8:
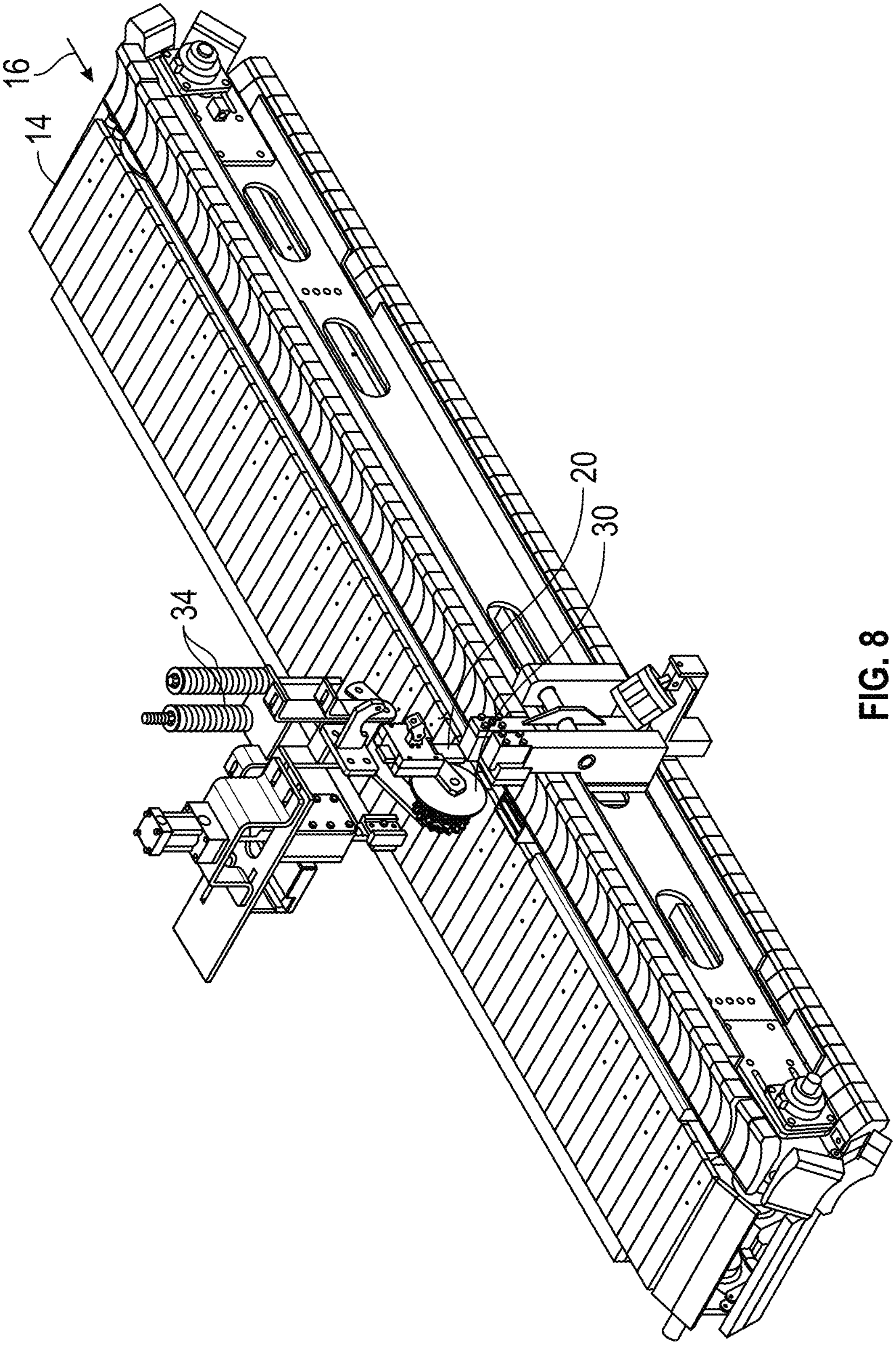
FIG. 8 is another perspective view of the conveyor, J blade, and roller assembly.

A loin puller machine is generally designated by the reference numeral 10 in FIGS. 1-6. The machine 10 includes a frame 12, and a conveyor 14 for carrying a carcass 15 from the inlet end (designated by the arrow 16) and past a series of blades for cutting. The conveyor may be a conventional conveyor, or may be the conveyor of Applicant's co-pending application Ser. No. 18/416,090, entitled LOIN PULLER CONVEYOR. The blades are mounted to the frame 12, and include a Z blade 18, a J blade 20, and a trim blade 22. The opposite ends of the conveyor 14 define a longitudinal axis along the length of the conveyor. The blades 18, 20, 22 may be conventional, or may be in the form of the sweep blades described in Applicant's co-pending application Ser. No.

18/416,535 entitled SWEEP EDGE BLADES FOR LOIN PULLER MACHINE, which is incorporated herein by reference in its entirety.

The machine 10 also includes a roller assembly 24 having a first arm 26, a second arm 28, a roller 30 with an axle 32, and one or more springs 34. The first arm 26 of the roller assembly 24 is mounted to the frame 12 of the machine 10. The second arm 28 is pivotally attached to the first arm 26 by a pin 36. The lower end of the second arm 28 includes a yoke through which the axle 32 extends to rollably support the roller 30. The spring or springs 34 is/are attached to the front end of the second arm 28 so as to bias the rear end of the arm 28 downwardly.

Figure 9:
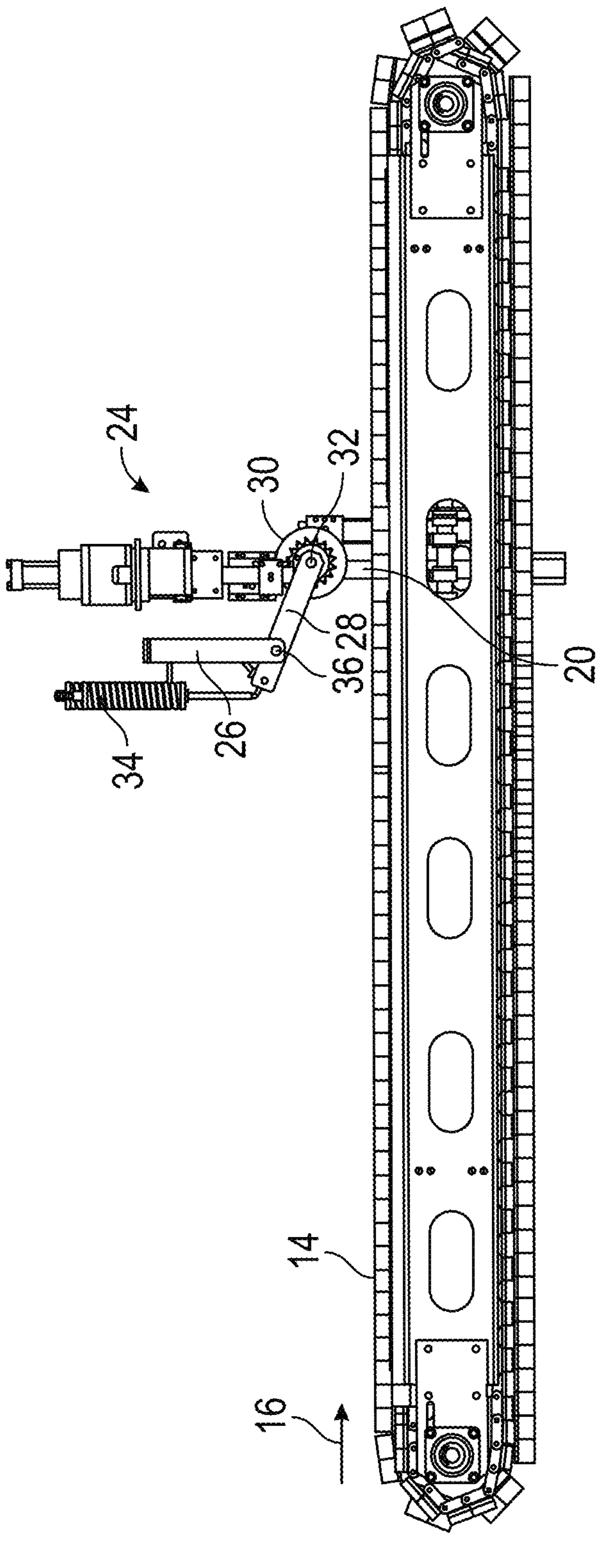
FIGS. 9 and 10 are opposite side elevation views of the conveyor, J blade, and roller assembly.
Figure 10:
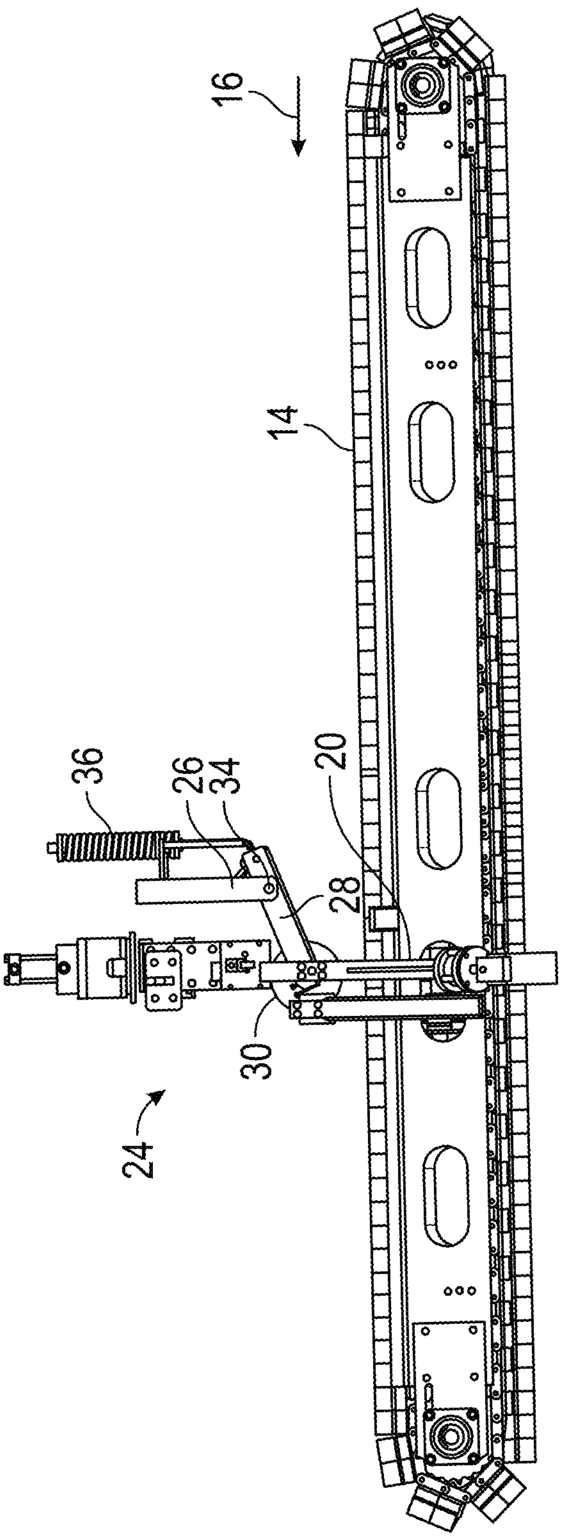
Figure 11:
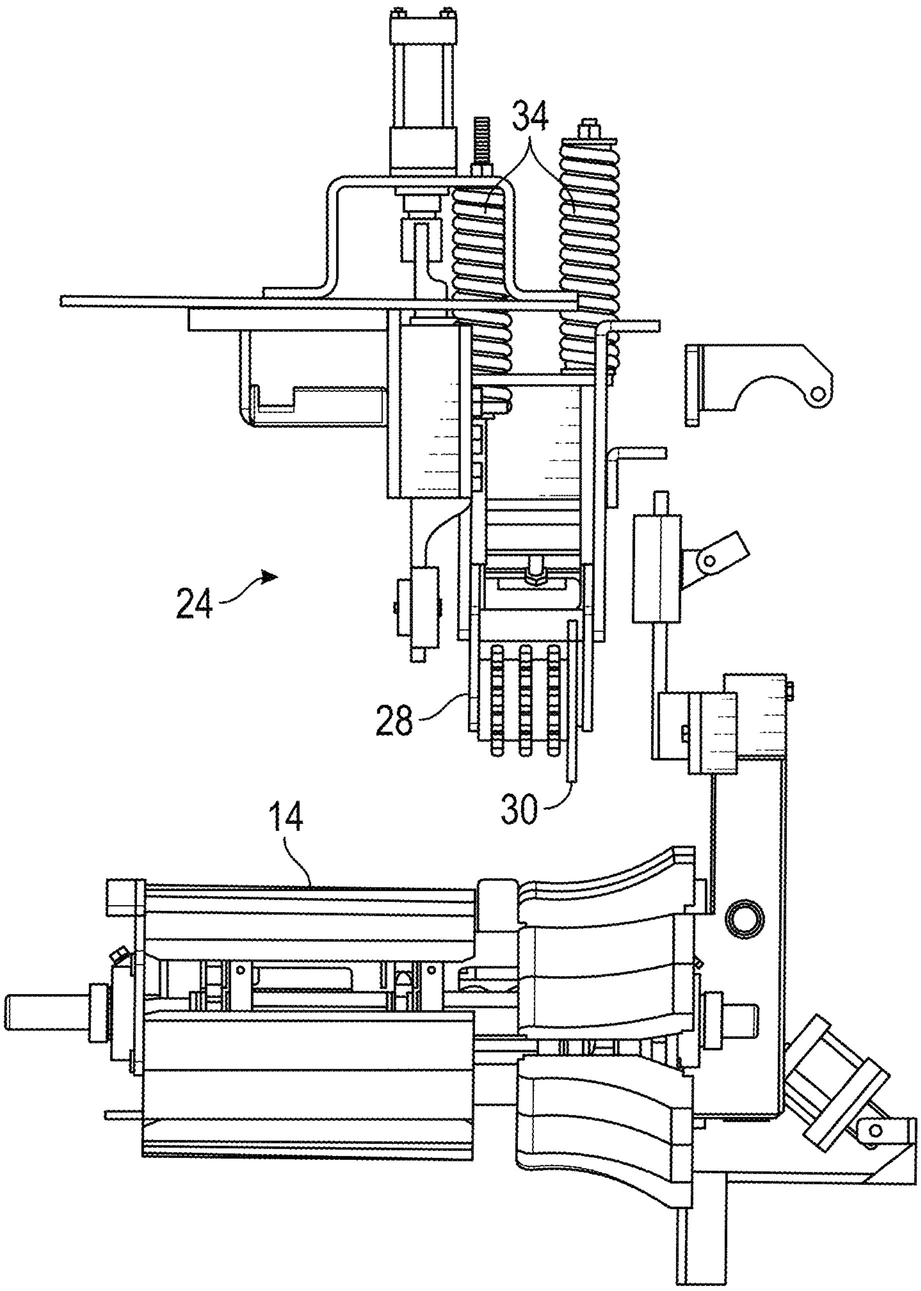
FIG. 11 is a rear elevation view of the conveyor, J blade, and roller assembly.
Figure 12:
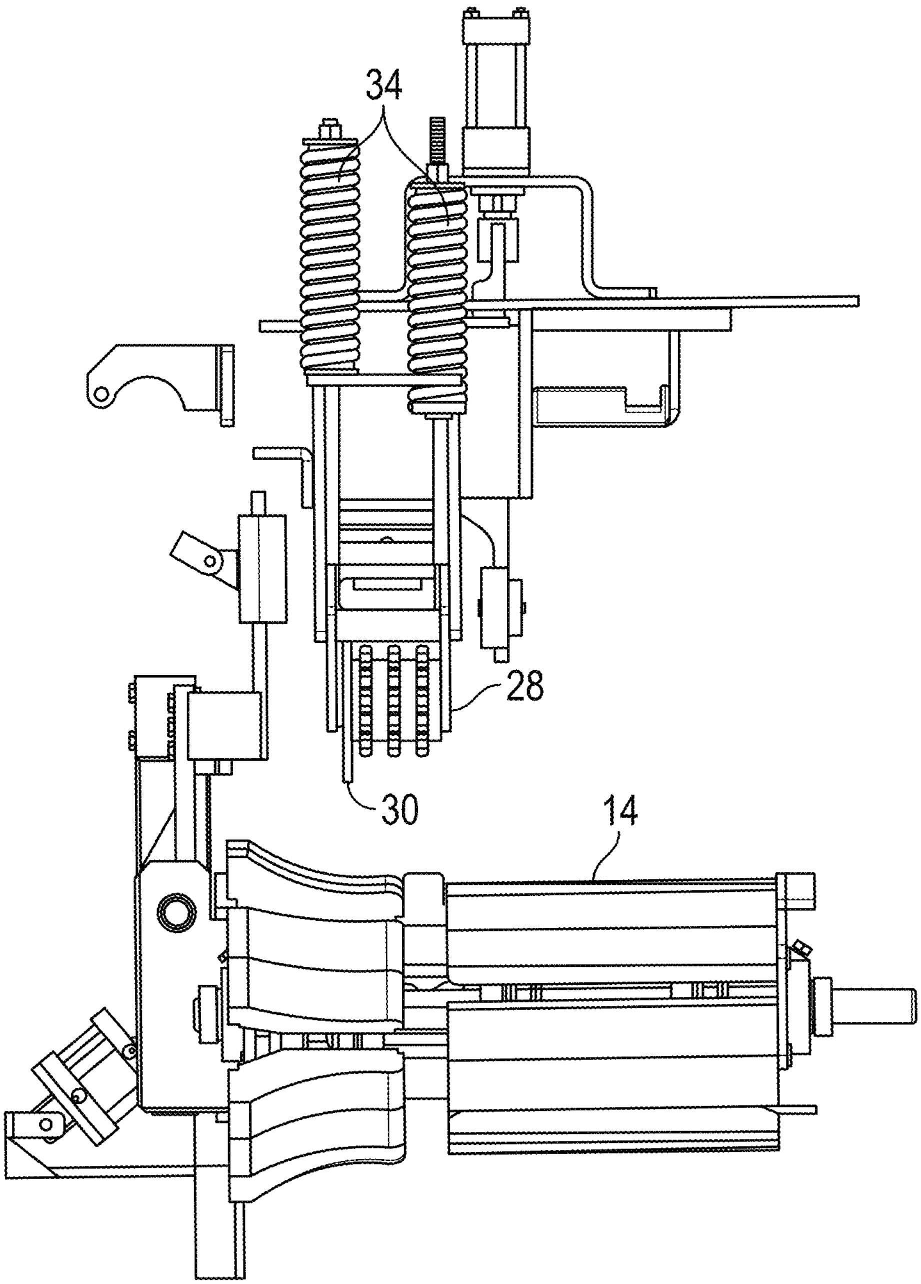
FIG. 12 is a front end elevation view of the conveyor, J blade, and roller assembly.
Figure 13:
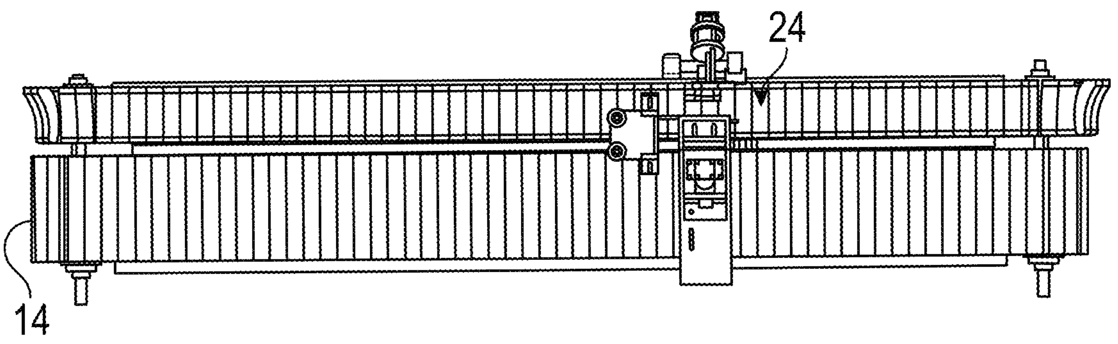
FIG. 13 is a top plan view of the conveyor, J blade, and roller assembly.
Figure 14:
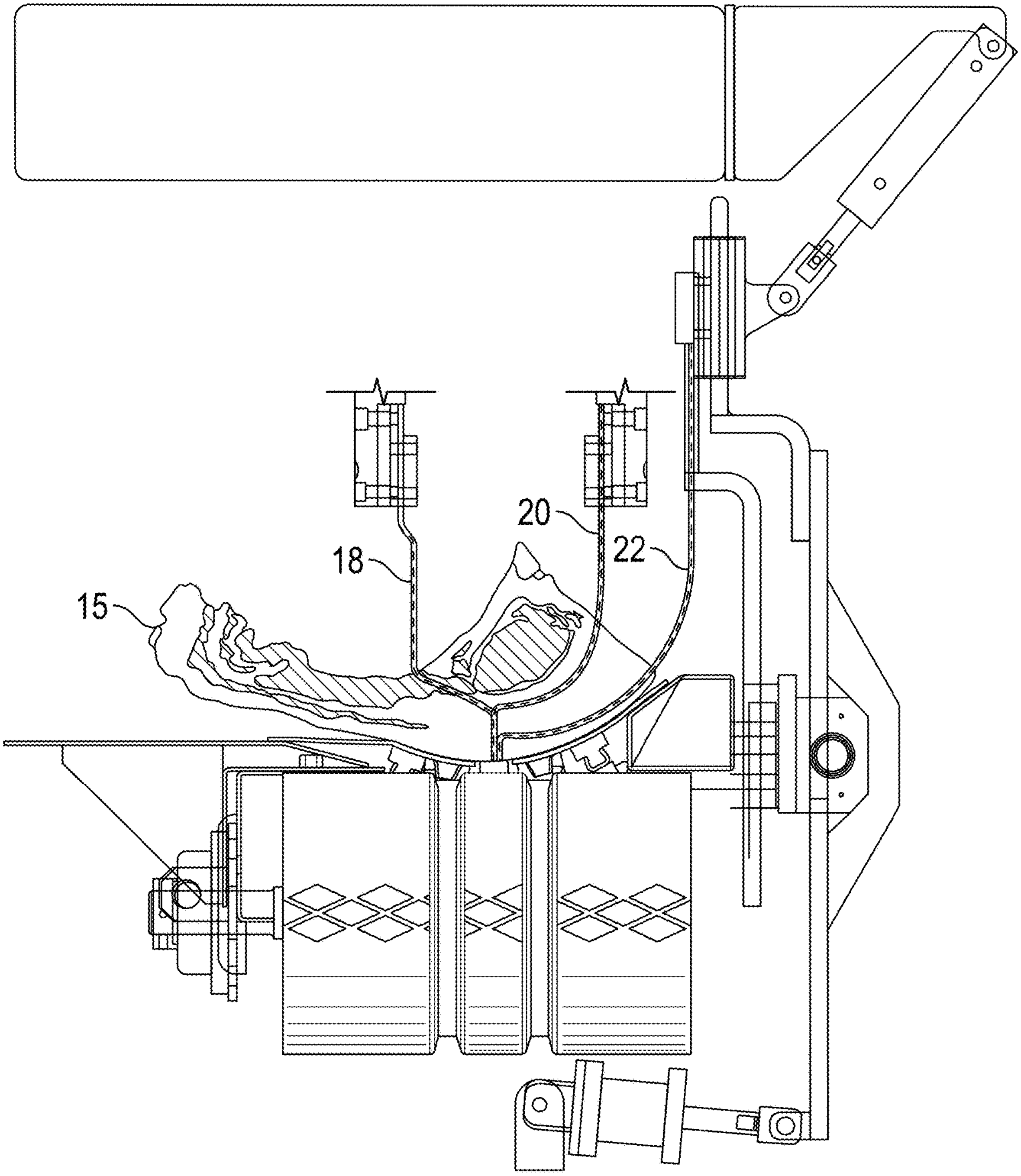
FIG. 14 is a schematic view of a carcass being cut by the Z blade, J blade, and trim blade.
Figure 15:
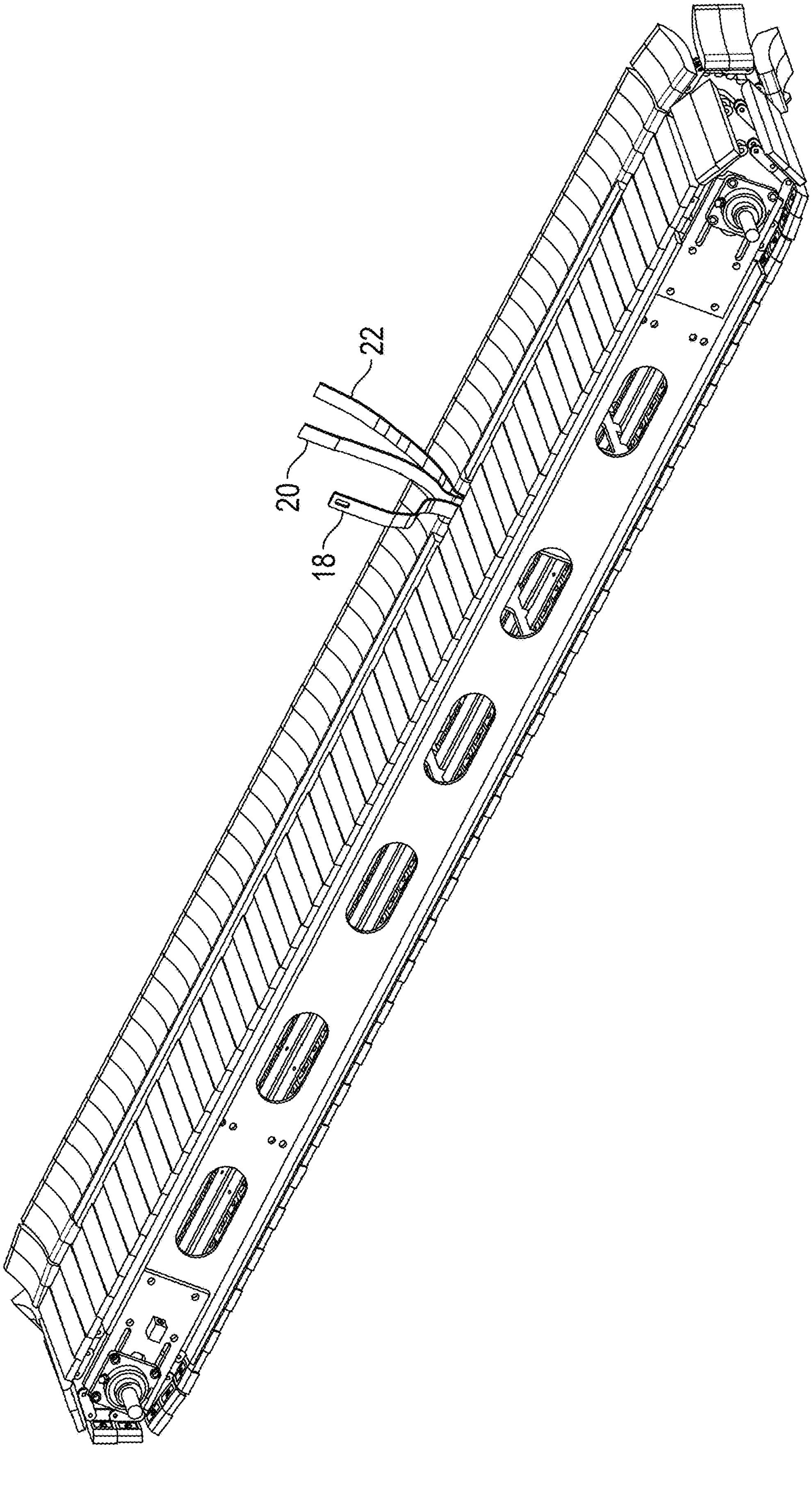
FIG. 15 is a perspective view of the Z blade, J blade, and trim blade relative to the conveyor of the machine.

The roller assembly 24 is mounted to the frame 12 in such a manner that the roller 30 is longitudinally aligned with the J blade 20. As best seen in FIG. 9, the axle 32 of the roller 20 is substantially longitudinally aligned with the J blade 20. Thus, the roller 30 is positioned directly above the cutting edge of the J blade 20. When the carcass 15 is carried by the conveyor 14, the roller 30 rides along a top portion of the loin carcass 15 so as to apply downward pressure to the carcass adjacent the J blade. This downward force on the carcass 15 provides improved depth control of the meat being cut from the carcass by the J blade 20. The roller assembly 24 compresses the carcass 15, which provides better pull of the carcass past the blade 20. This improved control provides more consistent and accurate cutting of the backpack from the loin portion by the J blade 20, thereby minimizing waste, maximizing yield, and increasing profitability to the operator.

The "scope" of the present disclosure is defined by the appended claims, along with the full scope of equivalents to which such claims are entitled. The scope of the disclosure is further qualified as including any possible modification to any of the aspects and/or embodiments disclosed herein which would result in other embodiments, combinations, subcombinations, or the like that would be obvious to those skilled in the art. For example, the roller assembly 24 described herein may be modified to any convenient structure that applies pressure to the carcass adjacent the J blade 20.

What is claimed is:

1. A loin puller machine, comprising:

a frame;

a conveyor operatively mounted to the frame for moving a carcass past a J blade for cutting fatback from the carcass;

a roller assembly extending downwardly from the frame and substantially aligned with the J blade to apply downward pressure on the carcass above the J blade as the carcass moves past the J blade.

2. The loin puller machine of claim 1 wherein the roller assembly includes an arm having an upper end pivotally mounted on the frame and a lower end, and a roller mounted on the lower end of the arm.

3. The loin puller machine of claim 2 wherein the roller is longitudinally aligned with the blade.

4. The loin puller machine of claim 2 wherein the roller includes a horizontal pivot axis longitudinally aligned with the blade.

5. The loin puller machine of claim 2 further comprising a spring connected to the arm so as to exert downward pressure by the roller on the carcass.

6. The loin puller machine of claim 2 wherein the roller assembly further includes a spring to bias the arm downwardly so that the roller rides on top of the carcass.

7. The loin puller machine of claim 1 wherein the blade has a cutting edge, and the roller assembly includes a roller aligned with the cutting edge.

8. The loin puller machine of claim 1 wherein the roller floats on top of the carcass.

9. A method of cutting fatback from a loin carcass, comprising:

conveying the loin carcass through a loin puller machine;

cutting the fatback with a J blade on the loin puller machine; and applying downward pressure with a roller on the loin carcass from above the J blade.

10. The method of claim 9 wherein the roller is longitudinally aligned with the J blade.

11. The method of claim 10 wherein the roller is laterally offset from the J blade.

12. The method of claim 9 further comprising applying a biasing force to the roller to engage the loin carcass.

13. The method of claim 9 wherein the roller floats on top of the loin carcass to follow the contour of the loin carcass.

14. A loin puller machine for cutting loin carcasses, comprising:

a conveyor for carrying the loin carcass past a series of blades, including a J blade;

a floating roller positioned above the J blade to apply downward pressure on the loin carcass as fatback on the carcass is cut by the J blade.

15. The loin puller machine of claim 14 further comprising a spring connected to the roller to bias the roller against the loin carcass.

16. The loin puller machine of claim 14 wherein the roller is substantially longitudinally aligned with the J blade.

17. The loin puller machine of claim 14 wherein the roller has a horizontal axle substantially aligned with the J blade.

* * * * *